(No Model.) 2 Sheets—Sheet 1.

G. M. BOLTON.
CORN PLANTER.

No. 398,695. Patented Feb. 26, 1889.

Attest:
Walter Scott.
Abner Greenleaf

Inventor:
George M. Bolton
By Paine & Ladd,
attys.

(No Model.) 2 Sheets—Sheet 2.

G. M. BOLTON.
CORN PLANTER.

No. 398,695. Patented Feb. 26, 1889.

Attest:
Walter Scott
Abner Greenleaf

Inventor:
George M. Bolton
By Paine & Ladd
Attys.

UNITED STATES PATENT OFFICE.

GEORGE M. BOLTON, OF DAILY BRANCH, NEBRASKA.

CORN-PLANTER.

SPECIFICATION forming part of Letters Patent No. 398,695, dated February 26, 1889.

Application filed August 10, 1888. Serial No. 282,425. (No model.)

*To all whom it may concern:*

Be it known that I, GEORGE M. BOLTON, a citizen of the United States, residing at Daily Branch, in the county of Dixon and State of Nebraska, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to corn-planters; and it consists in the novel construction and combination of the parts, as hereinafter fully described and claimed.

Figure 1:
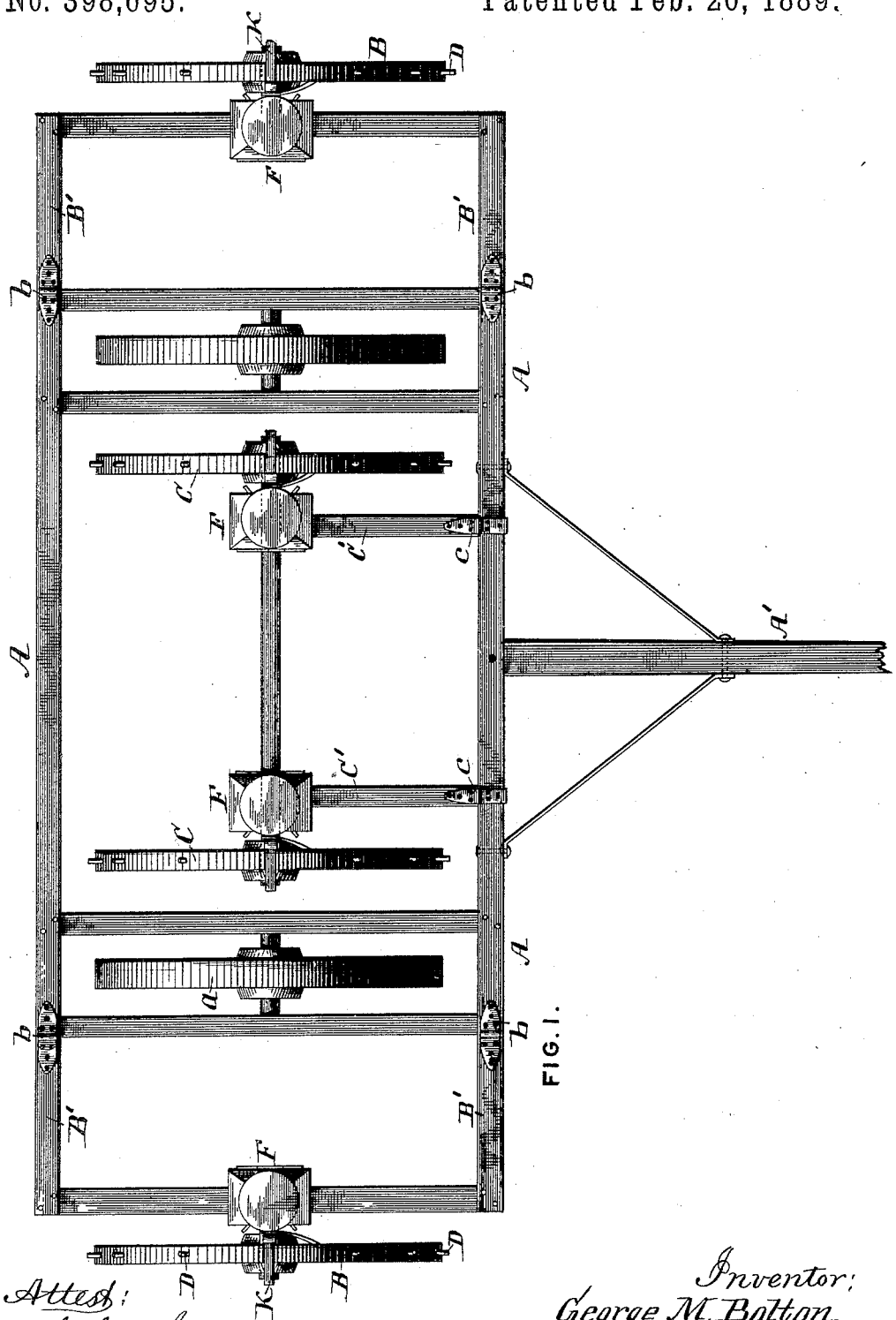
Figure 2:
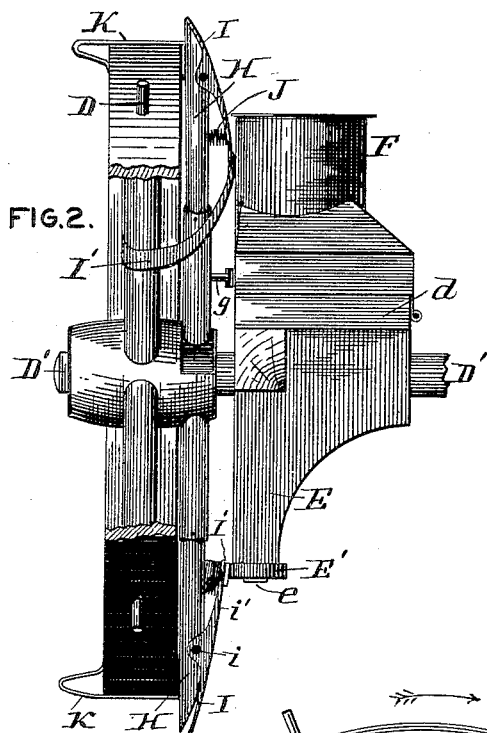
Figure 3:
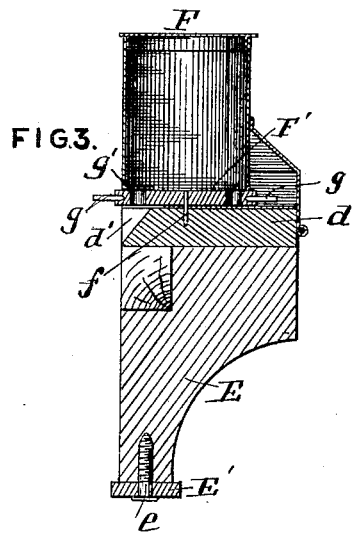
Figure 5:
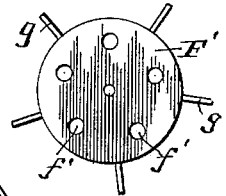
Figure 4:
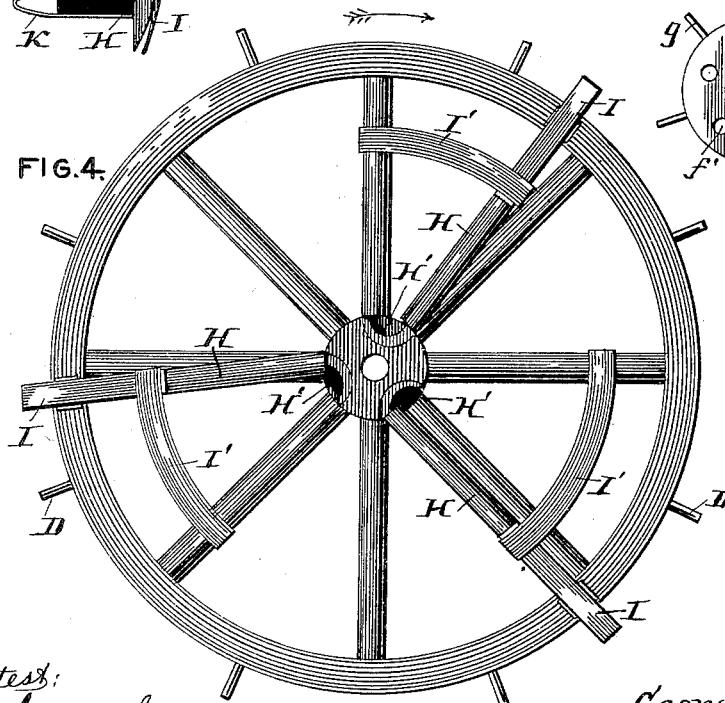

In the drawings, Figure 1 is a plan view from above of the complete machine. Fig. 2 is an edge view of one of the dropping-wheels, partly in section. Fig. 3 is a vertical section through one of the seed-holders. Fig. 4 is a side view of one of the dropping-wheels. Fig. 5 is a detail plan view of the seed-valve.

A is the main frame of the corn-planter, provided with a tongue, A', and with bearing-wheels $a$.

B B are the outside dropping-wheels, supported by the frames B', which are pivoted to the main frame A by the hinges $b$. C C are the inside dropping-wheels, supported by the frames C', which are pivoted to the main frame A by the hinges $c$. The inner and outer dropping-wheels are both alike, and are provided with seed-holders and other parts, as will be more fully described hereinafter. The object of supporting the dropping-wheels upon subordinate frames hinged to the main frame is to enable the planter to be turned around upon the running-wheels $a$ and moved about without turning the dropping-wheels. Each dropping-wheel is provided with a rim, spokes, and hub of ordinary construction, and has a series of spurs, D, projecting from its rim, which are pressed into the ground as the wheel revolves.

D' is the journal upon which the dropping-wheel turns, and $d$ is a flat iron plate secured to the frame, and having the seed-passage $d'$ cut in its edge.

E is a support for the trip-roller E', also secured to the frame, and $e$ is the pivot upon which the said trip-roller turns.

F is the seed-holder, secured on top of plate $d$, and F' is the seed disk or valve journaled at the bottom of the said seed-holder upon the pin $f$. The seed-valve is provided with pockets $f'$, which pass through it; and $g$ are pins which project from the edge of the valve for turning it around. A flange or cut-off, $g'$, is secured in the lower part of the seed-holder for covering the pockets as they are brought over the seed-passage $d'$, and permitting them to empty their contents.

H H are the dropping-tubes, which are telescopic in form, so that they may be adjusted to plant at different depths.

H' is a scoop, which is formed upon the end of each tube H and let into the hub of the wheel. The dropping-tubes are secured to the wheels, and as they revolve each tube strikes against one of the pins $g$ and turns the valve so that the seed in one of the pockets $f'$ is discharged down the seed-passage $d'$ into the scoop H' beneath it. The continued revolution of the wheel allows the seed in the scoop to slide down the tube H.

K are feet secured to the rim of the dropping-wheel opposite to the dropping-tubes. These mark the place of deposit of the corn and increase the bearing-surface of the wheel opposite the dropping-tubes, so that the valves do not become choked with dirt.

I is a valve which closes the bottom of tube H and is pivoted on the pin $i$.

I' is a spring cam-plate secured at one end to the tail $i'$ of the valve, and having its other end attached to one of the spokes of the wheel.

J is a spiral spring under the tail of the valve for keeping it closed. As the wheel revolves the spring cam-plate I' bears against the roller E', which opens the valve when the end of the dropping-tube is in the ground and allows the seed in the tube to fall out. The spring J closes the valve as soon as the tube is clear of the ground.

What I claim is—

1. In a corn-planter, the combination, with the main frame provided with bearing-wheels, of the pivoted end and central subordinate frames, and the dropping-wheels carried by said subordinate frames, substantially as set forth.

2. In a corn-planter, the combination, with the dropping-wheel, of the dropping-tubes secured to the spokes thereof and provided with scoops at their inner ends, and a seed-holder provided with a valve operated by said tubes for delivering grain into said scoops, substantially as set forth.

3. In a corn-planter, the combination, with a revolving seed-tube provided with the scoop H' at its inner end and a discharge-valve at its other end, of the seed-holder having a seed-valve operated by said tube, and a lower trip-roller for opening the said discharge-valve when the end of the tube is in the ground, substantially as set forth.

4. In a corn-planter, the combination, with a dropping-wheel, of the dropping-tubes secured to said wheel and provided with scoops at their inner ends and discharge-valves at their outer ends, the spring cam-plates secured to the spokes of the wheel and to the said discharge-valves, the lower trip-roller for bearing against the cam-plates and opening the valves as the wheel revolves, and a seed-holder provided with a valve for delivering seed into the said scoops, substantially as set forth.

5. In a corn-planter, the combination, with a dropping-wheel, of the dropping-tubes secured to the wheel and provided with scoops and discharge-valves, the spring cam-plates secured to the spokes of the wheel and to the said discharge-valves, the trip-roller for bearing against the cam-plates and opening the valves as the wheel revolves, and a seed-holder provided with a valve for delivering seed into the said scoops, substantially as set forth.

6. In a corn-planter, the combination, with the dropping-wheel, of the telescopic dropping-tubes secured to the wheel and provided with scoops H', the discharge-valves pivoted to the ends of the tubes and provided with springs for closing them, the spring cam-plate secured to the valves and to the spokes of the wheel, the trip-roller for opening the discharge-valves, and the seed-holders provided with a valve for delivering seed into the scoops, substantially as and for the purposes set forth.

In testimony whereof I affix my signature in presence of two witnesses.

GEORGE M. BOLTON.

Witnesses:
A. G. KINGSBURY,
JOSEPH N. PEEL.